United States Patent [19]

Niemann

[11] 4,154,163
[45] May 15, 1979

[54] CCX EXTRACTOR

[75] Inventor: Gary O. Niemann, Winter Haven, Fla.

[73] Assignee: FMC Corporation, San Jose, Calif.

[21] Appl. No.: 799,419

[22] Filed: May 23, 1977

[51] Int. Cl.² .............................................. B30B 9/02
[52] U.S. Cl. ................................... 100/98 R; 99/495; 99/509; 100/108; 100/213
[58] Field of Search ................ 100/107, 108, 98 R, 100/213, 295, 37; 99/506, 509, 495, 507, 508

[56] References Cited

U.S. PATENT DOCUMENTS

| | | | |
|---|---|---|---|
| 2,363,798 | 11/1944 | McCulloch | 100/98 R |
| 2,608,152 | 8/1952 | Hait | 100/107 |
| 2,649,730 | 8/1953 | Hait | 100/37 |
| 2,780,988 | 2/1957 | Belk et al. | 100/37 |
| 3,736,865 | 6/1973 | Hait | 100/108 |
| 3,866,528 | 2/1975 | Montagroni | 100/98 R X |

Primary Examiner—Harvey C. Hornsby
Assistant Examiner—John M. Jillions
Attorney, Agent, or Firm—F. W. Anderson

[57] ABSTRACT

A curved cup juice extractor wherein the cup is composed of two matching sections of curved interdigitating fingers which move together arcuately to enclose and squeeze the whole fruit, during which the movement and release of the cup sections is controlled by a cam and a torsional spring, and a rapid fruit feeder system works on a principle of throwing the fruit into the curved cup as the cup opens.

11 Claims, 10 Drawing Figures

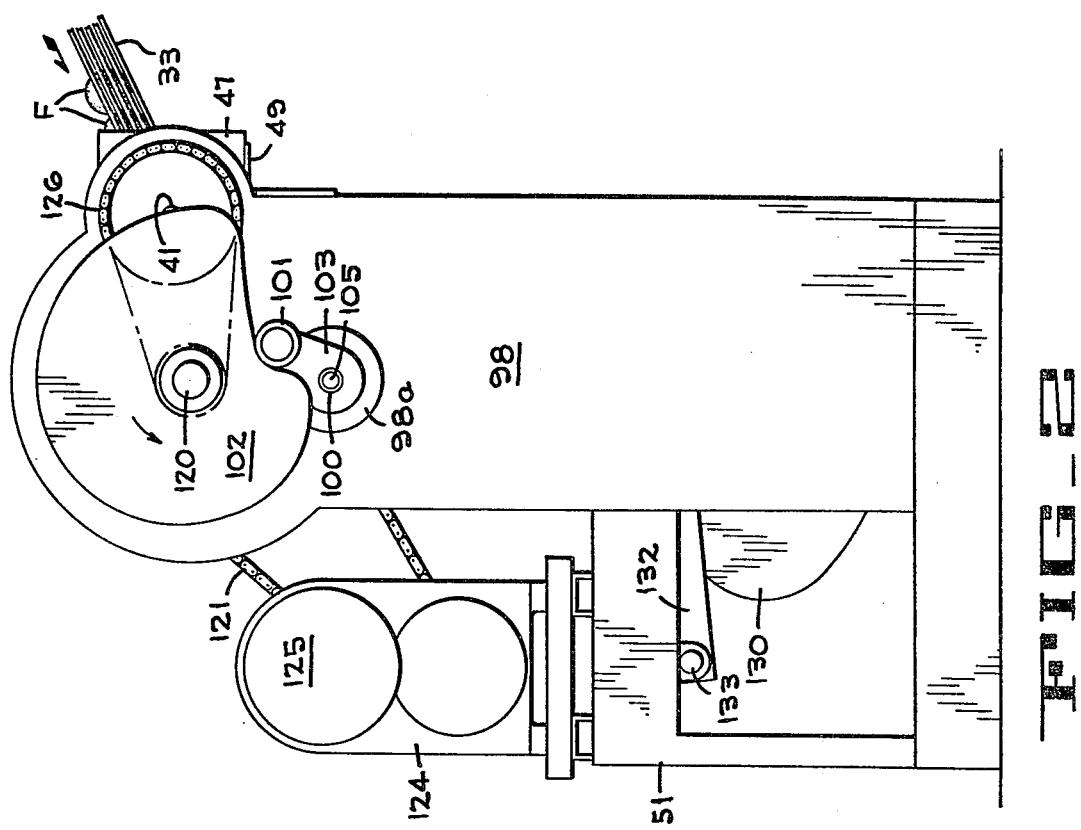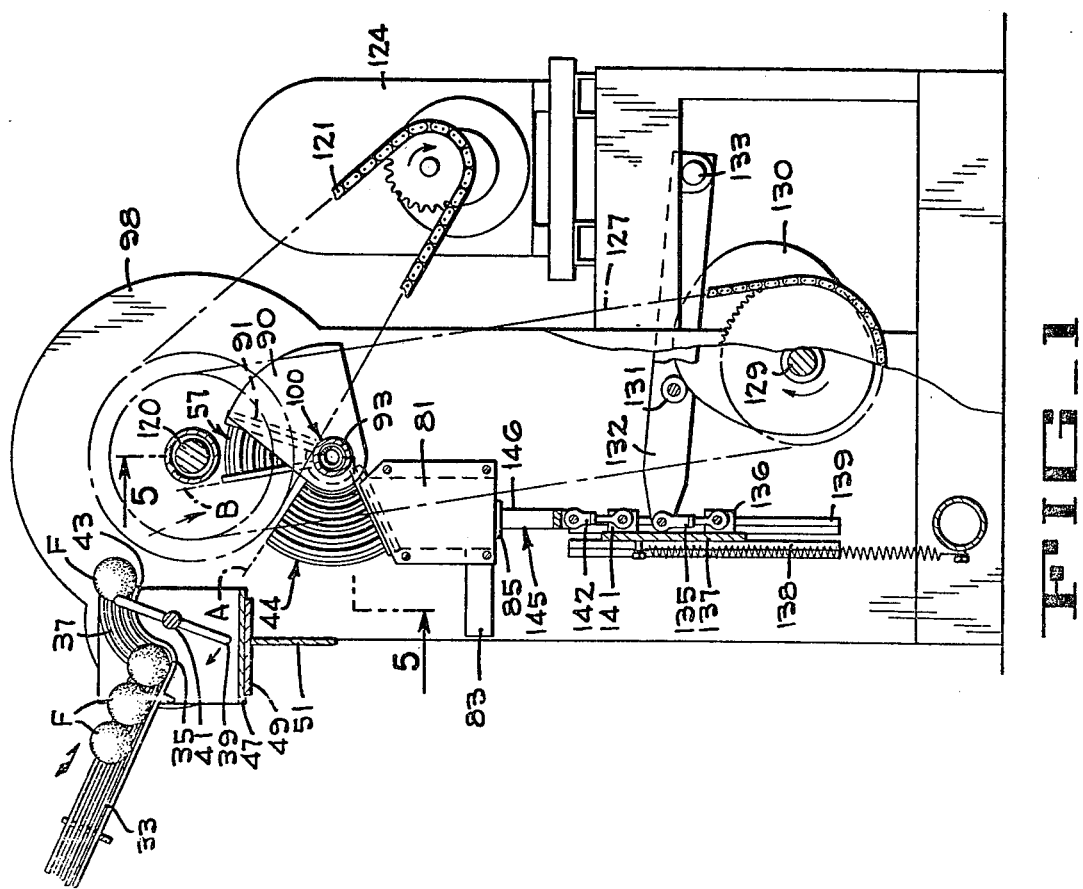

FIG_3
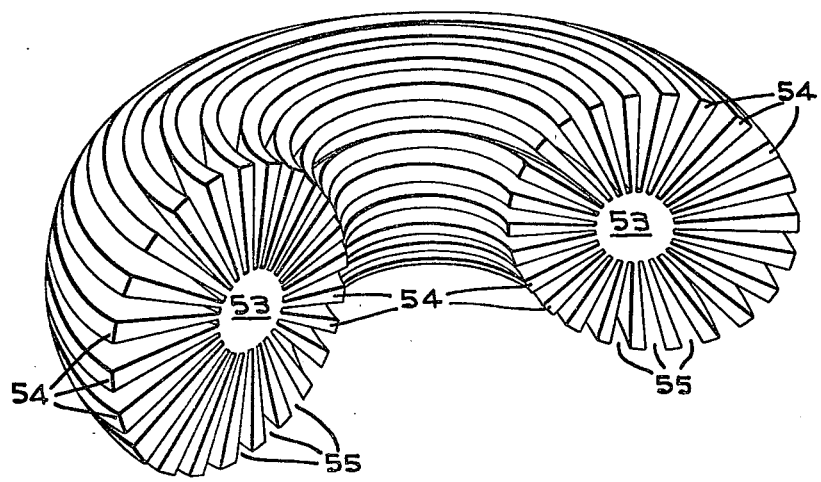
FIG_4
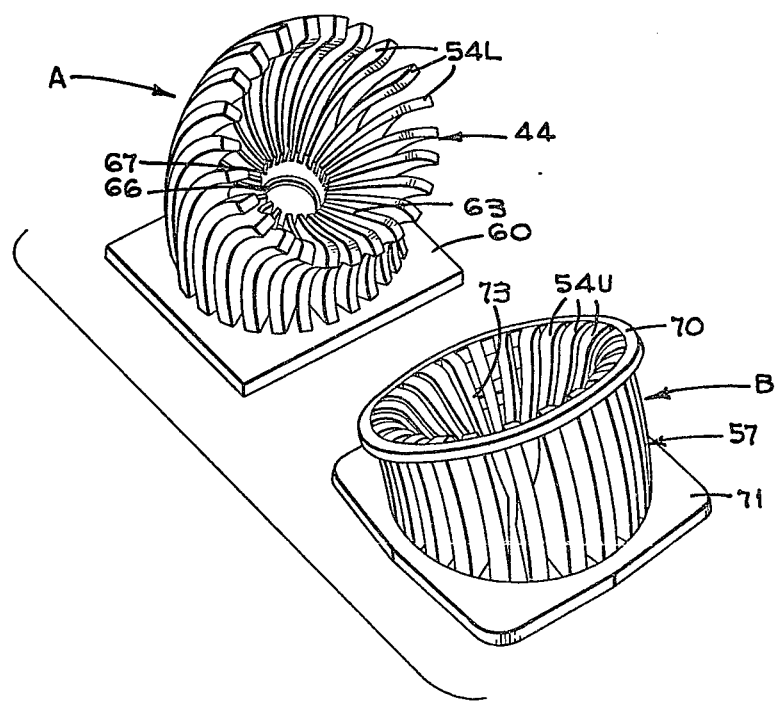

FIG-5

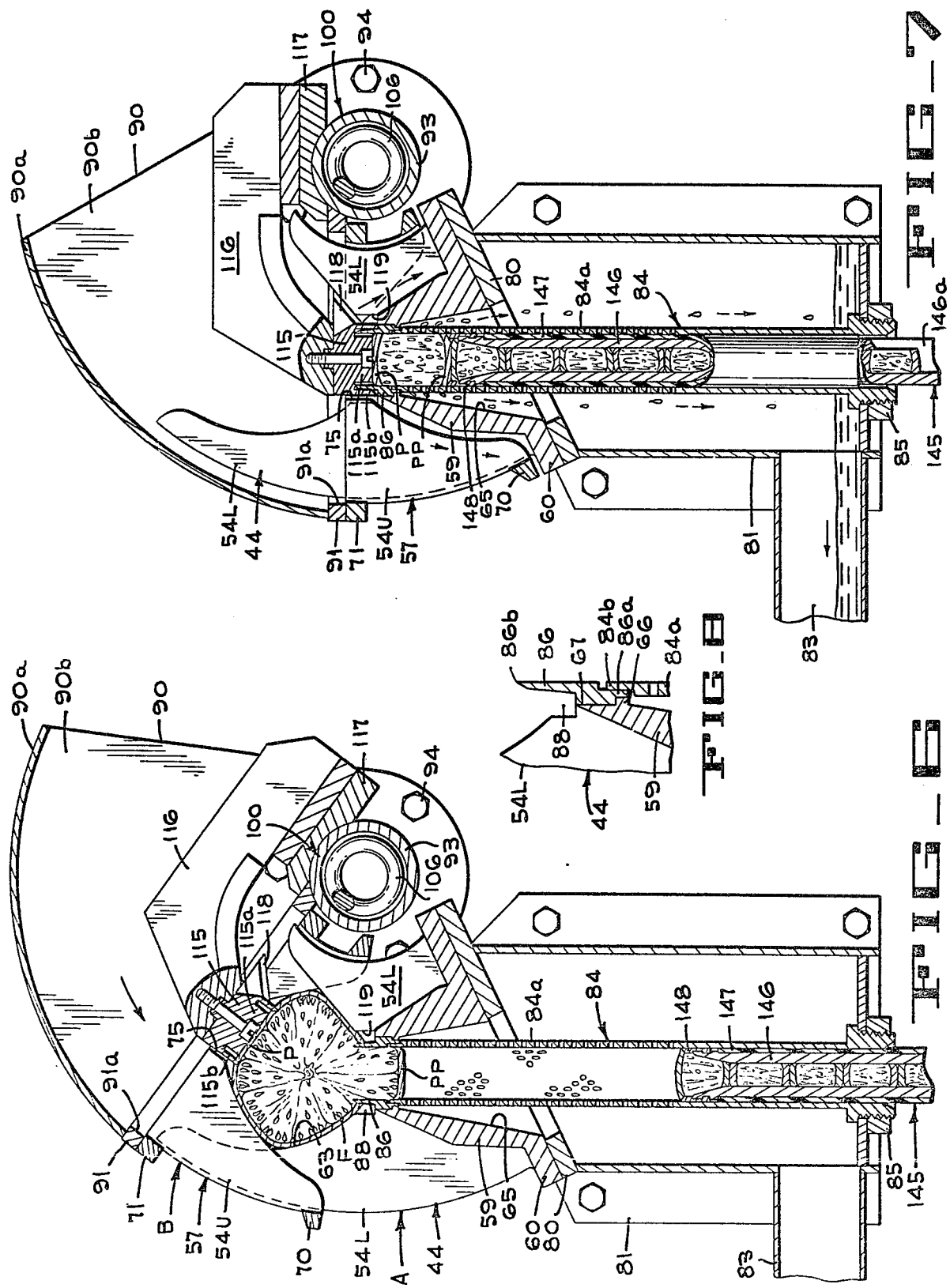

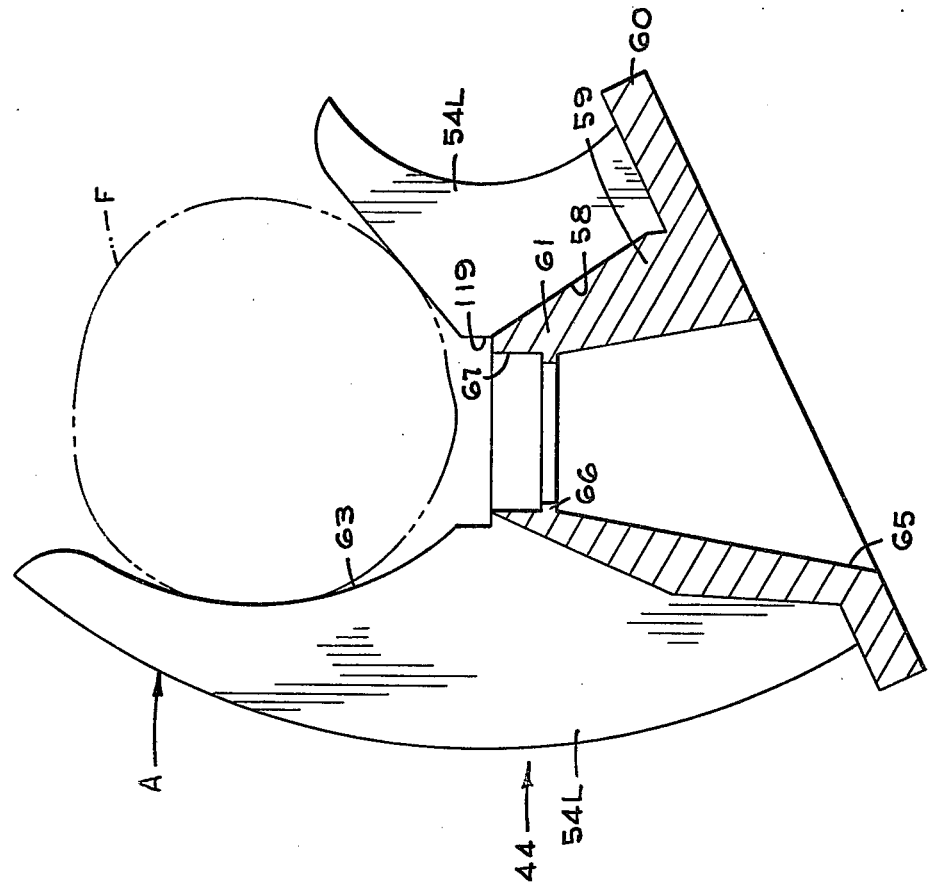
FIG_9
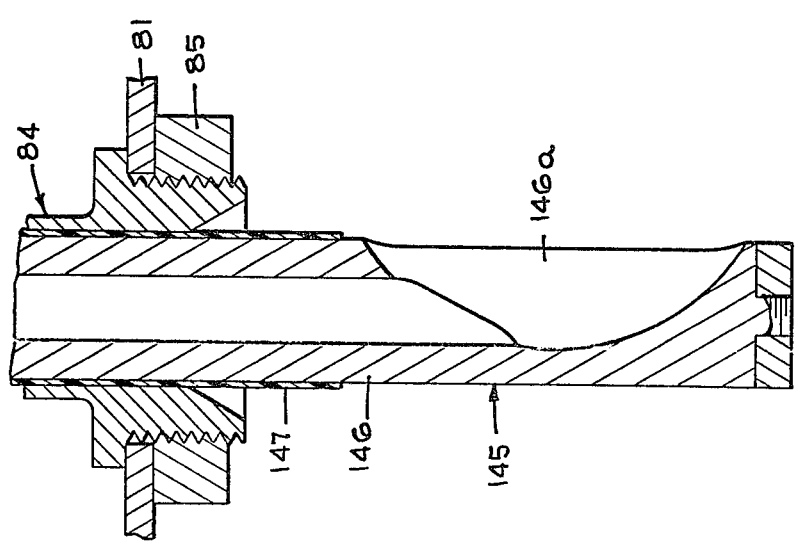
FIG_10

CCX EXTRACTOR

BACKGROUND OF THE INVENTION

1. Field of the Invention

This invention relates to the art of extracting juice and peel oil from whole citrus fruit and the separation of the fruit peel, pulp and seeds therefrom.

2. Description of the Prior Art

The invention constitutes improvements on the methods and apparatus disclosed in U.S. Pat. to Hait No. 2,608,152 (issued Aug. 26, 1952), Hait U.S. Pat. No. 2,649,730 (issued Aug. 25, 1953) and Belk and Frost U.S. Pat. No. 2,780,988 (issued Feb. 12, 1957).

The machines of each of the above patents features the use of a cup formed by upper and lower members each of which is formed with spaced finger-like elements, the upper member being positioned directly above the lower member. When a fruit has been fed into the lower cup member, and the upper cup member is moved downwardly with a straight-line movement, the fruit is progressively crushed between the cups while the fingers of the cups interdigitate with each other. After the fruit has been crushed, the upper cup must be raised a considerable distance to allow another fruit to be fed into the lower cup. Thus, the straight-line vertical movement of the upper cup requires a considerable amount of overhead space to accommodate it.

The machine of the present invention makes use of an upper cup member that is mounted for pivotal movement relative to the lower member, and travels only a short distance before fruit can be fed into the lower cup. The short arcuate travel of the upper cup makes possible a fruit feeding and crushing cycle that is shorter in time than the cycle of a machine using a straight-line movement of the upper cup member.

SUMMARY OF THE INVENTION

The present invention concerns an apparatus for separating pulp, seeds, peel and peel oil from the juice of a fruit, the apparatus comprising a pair of curved coaxial cup members with hemispherical bowl cavities. One cup member is stationary, and the other pivots relative to the first between open and closed positions. The cup members have side walls defined by narrow fingers separated by correspondingly narrow slots, the fingers of each cup member being substantially parallel to the curved axis of the cup and being aligned with the slots of the other cup member for interdigitation. The stationary cup member is in a position generally below the pivoting member and has an axial passage therethrough with a tubular cutter mounted in said passage to cut a circular incision in the peel of a fruit held in said lower cup. The upper cup, in turn, has a circular cutter to cut another circular incision in the peel of the captive fruit, and means defining a narrow annular passage around said circular cutter through which the fruit peel is forced.

It is an object of this invention to provide an apparatus for separating fruit pulp, seeds, peel, peel oil and juice in one operation, using fruit cups which move in a short arcuate path that allows a substantial increase in speed.

Additional objects and advantages of the present invention will become apparent from the following description and drawings.

BRIEF DESCRIPTION OF THE DRAWINGS

FIG. 1 is a diagrammatic side elevation, with parts broken away and parts shown in section of the machine of the present invention.

FIG. 2 is a diagrammatic elevation of the side of the machine opposite that of FIG. 1.

FIG. 3 is a perspective view of a portion of the "aluminum donut" from which the two curved cup components of the machine are formed.

FIG. 4 shows the two curved cup components with the interdigitating fingers in non-operational perspective views.

FIG. 5 is a section taken substantially along line 5—5 of FIG. 1 showing inter alia the torsional spring which drives the movable cup component of the machine.

FIG. 6 is an enlarged sectional view taken through the cup section of the machine showing the position of the fruit as interdigitation begins and the circular incisions are made in the peel of the fruit.

FIG. 7 is a section similar to FIG. 6 but showing an advanced stage of the interdigitation of the cups.

FIG. 8 is an enlarged sectional view of a portion of FIG. 7.

FIG. 9 is an enlarged section taken through the fixed lower cup of the machine.

FIG. 10 is a fragmentary section of the bottom part of the orifice tube of the machine.

DESCRIPTION OF THE PREFERRED EMBODIMENT

Referring to FIG. 1, the fruit is delivered on an inclined guideway 33, the guideway having an abrupt upward turn in direction at 35, after which said guideway follows arcuate path 37 for a short distance. The abrupt turn at 35 acts as a temporary stop for the pieces of fruit, which roll down the guideway in serial fashion. A double arm feeder 39 is attached to and driven rotationally by a shaft 41 in timed relation with the rest of the machine as will be explained presently. As shown in FIG. 1, the arms of the feeder 39 rotating in a clockwise direction urge the bottommost fruit positioned at 35 up and around the arcuate guideway 37. As the fruit F reaches the end 43 of the arcuate guideway, its speed carries it past the end and it thereafter travels a ballistic trajectory in free fall until it reaches a hemispherical cavity formed in a lower curved cup component 44. The guideway and feeder mechanisms are mounted in a three-sided box 47 which is open at the top, front and rear and is mounted upon a horizontal plate 49 which is part of the main upper frame 51 of the subject machine.

FIG. 3 is a view showing a portion of an "aluminum donut" from which the curved cup components are formed. To fabricate the cup components, one begins with a solid metal torus and removes various conical sections of the metal, leaving a torus 53 of smaller radius from which a sequence of metal "fingers" (actually, conical sections) 54 radiate. Each slot 55, defined by two adjacent fingers 54, is of such size that one of the metal fingers 54 may fit into it after removal of the inner torus 53; this allows interdigitation of the fingers, as discussed below.

Two angular sections of the resulting object are now taken, section A (FIG. 4) being of about 60° angular extent for use in forming the lower cup 44 (FIG. 4) and section B, of about 30° angular extent, being used to form the upper cup 57. Referring to FIG. 9, it will be seen that a generally conical cavity 58 is cut in the under surface of the lower cup 44. This cut destroys the lower portion of the inner core 53 of section A. A hub 59, having a flange plate 60 at its lower end, is provided with a generally conical portion 61 that mates with the cavity 58 in the section. The hub 59 is positioned in the cavity and secured, as by brazing, to the side and lower edges of the fingers of the lower cup which will be designated 54L. While the hub 59 is holding the fingers 54L in fixed position, a generally hemispherical cavity 63 is cut in the upper end of section A, the axis of the hemisphere being substantially coaxial with the generator line of the original torus. Then the hub 59 is bored out to form a frusto-conical cavity 65, an inwardly projecting rib 66, and a cylindrical wall 67. During this operation the remaining portion of the inner core 53 is removed and the inner ends of the fingers 54L are flattened off.

The upper cup (FIG. 4) is formed by brazing a ring 70 around the upper end of section B and a square flange 71 around the lower end. A generally hemispherical cavity 73 is cut in the upper end of the section with the axis of the hemisphere coinciding with the axis of the original torus. As seen in FIG. 6, a cylindrical passage 75 is cut through section B at the base of the hemisphere to free the inner ends of the fingers 54U of the upper cup and provide them with flattened end faces.

The flange plate 60 of the lower cup 44 is secured to a cross-plate 80 which is mounted across the upper end of a closed housing 81. The housing is supported in fixed position from the main frame 51 by suitable members (not shown) and has a juice discharge tube 83 projecting from one lower wall portion. The housing also encloses a finishing tube 84 that is secured at its lower end in a lower wall of the housing 81 by means of a nut 85. At its upper end, the finishing tube has a perforated portion 84a and a cylindrical portion 84b (FIG. 8) disposed snugly within a cylindrical skirt 86a of a cutter 86, the cutter being bottomed on the inwardly projecting rib 66 of the lower cup 44 and in press-fit engagement with the cylindrical wall 67 of the cup. The cutter 86 has an upper cylindrical cutting edge 86b, and it is to be noted that an annular space 88 is formed between the cutter and an upper portion of the inner edges of the fingers 54L of the lower cup.

Figure 5:
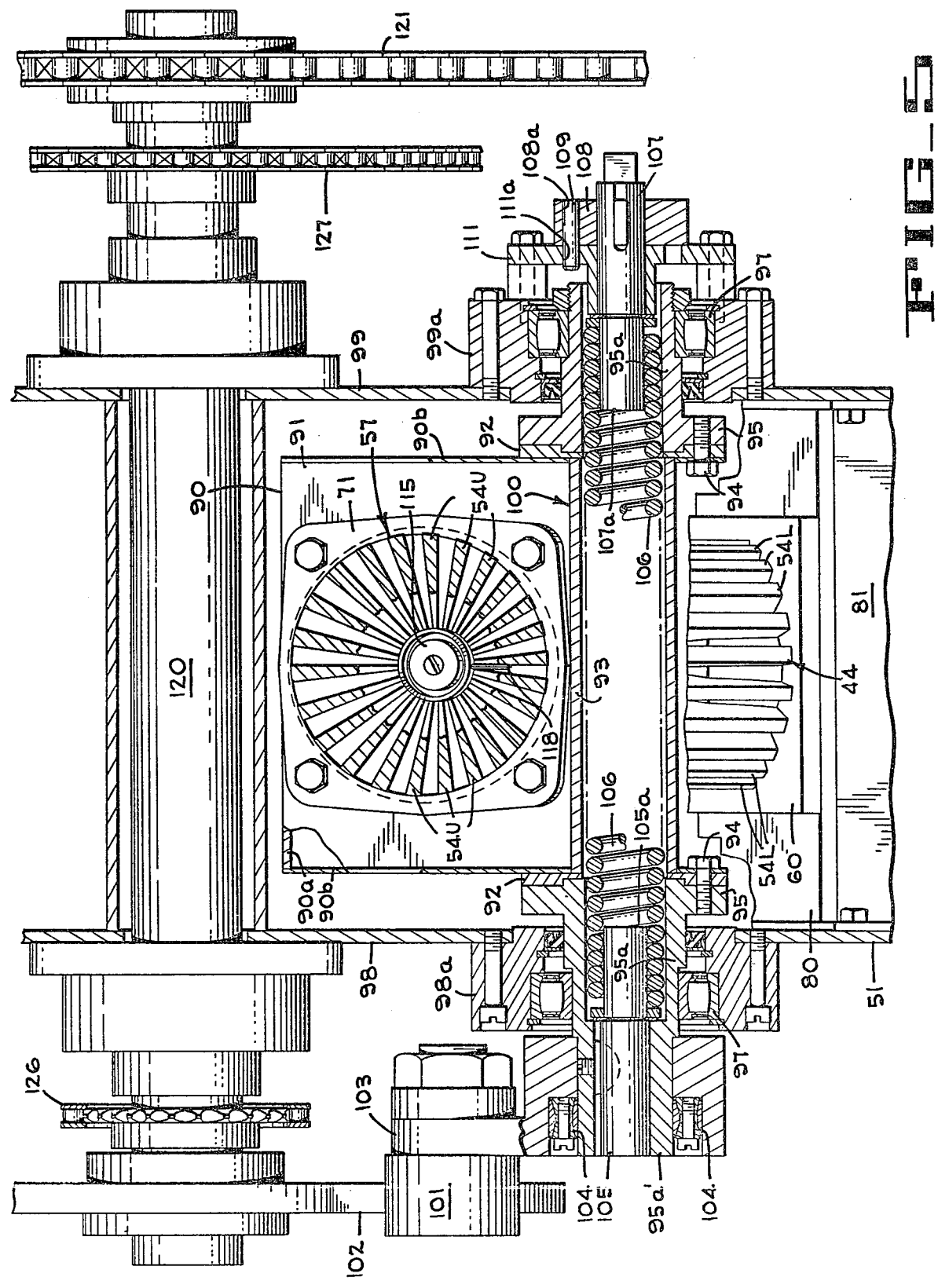

The upper cup 57 is mounted on a swinging housing 90 (FIG. 6) which includes a mounting plate 91 to which the square flange 71 of the cup 57 is bolted. The mounting plate 91 has a large central aperture 91a disposed immediately behind the fingers of the upper cup so that material passing upwardly through the central passage 75 will be received within the housing 90. The housing 90 has an upper curved wall 90a (FIG. 7) and two side walls 90b (FIG. 5), each side wall being welded at its lower end to a flange plate 92, the two flange plates 92 being welded in turn to a central tube 93. At each end of the tube 93, capscrews 94 extend through the side wall 90b and the associated flange plate 92 to engage and lock the housing on a mounting flange plate 95. Each flange plate 95 has a sleeve portion 95a which is journaled for rotation in a bearing unit 97 fixed in enlarged portions 98a and 99a of side walls 98 and 99 respectively which are part of the main frame 51 of the machine. Thus the central tube 93 and the flange plates define a tubular shaft 100 which mounts the housing 90 and the upper cup carried thereby for swinging movement about the axis of the bearing units 97.

The housing is pivoted by means of a cam roller follower 101 that bears against a rotatable cam 102 and is rotatably carried at the outer end of an arm 103 which is locked by expanders 104 to an extended portion 95a' of one of the sleeves 95. A stub shaft 105, which is keyed to the inner wall of the extended sleeve portion 95a', has a cylindrical end portion 105a which receives therearound one end of a coil spring 106, the other end of the spring being disposed around a cylindrical end 107a of a stub shaft 107 that is keyed to a locking plate 108. A removable pin 109 is disposed in a hole 108a in plate 108 and in one of several holes 111a of a bracket 111 that is fixed to one of the enlarged portions 99a of the side wall 99. It will be appreciated that, when the pin 109 is removed from the locking plate 108 and the plate is rotated in a particular direction, the stub shaft 107 will grip one end of the torsion spring 106 and wind it up so that the other end of the spring grips the stub shaft 105 and rotates it. The spring is so oriented in relation to the shafts that this winding action will urge the cam follower 101 against the cam and keep it in contact therewith.

Referring to FIG. 6 it will be noted that an upper cutter 115 is mounted inside the swinging housing 90 on a bracket 116 that is secured by means of a mounting plate 117 to the central tube 93 of the housing for movement therewith. The cutter has a central cylindrical body portion 115a and a cylindrical blade 115b spaced from the body portion. The cutter 115 is located in a position such that the cylindrical blade lies immediately inwardly of the fingers 54U of the upper cup and, as seen in FIG. 7, the blade is arranged to move into the annular space 88 between the lower cutter and the fingers of the lower cup when the cups are in substantially closed relation. An upright knife 118 is formed on the cutter 115 to project radially outwardly from the central body portion 115a in a position overlying a portion of the annular space 119 between the outer periphery of the cutter 115 and the inner edges of the fingers of the upper and lower cups.

The cam 102 (FIG. 2) that controls the cam follower 101 and the tubular shaft 100, is keyed to a shaft 120 that is driven through a sprocket and chain drive 121 from a motor driven speed reducer drive unit 124 driven by a motor 125. The shaft 120 in turn drives the shaft 41 of the feed unit through a sprocket and chain drive 126. Also connected to shaft 120 is a sprocket and chain drive 127 (FIG. 1) that is connected in driving relation to a cam shaft 129 which carries a cam 130. The cam 130 engages a follower 131 on a lift arm 132 which is pivoted at 133 on the machine frame. The lift arm is pivotally connected to a link 135 which is in turn pivoted on a block 136 carried by a slide plate 137. Two plates 138 and 139 define a guide passage for permitting vertical movement of the slide plate 137 and of an upper block 141 which is carried by slide plate 137 and is pivotally connected through a link 142 to the lower end of a tubular plunger 145. The plunger, which extends up into the finishing tube 84 as seen in FIG. 6, may be of the type shown in U.S. Pat. No. 2,846,943 comprising in general a central tubular body 146 having a plastic sleeve 147 thereon and a longitudinally slit, annular, resilient knife 148 telescoped over the upper end of the plunger and secured thereto by a tongue and groove joint which permits the knife to be expanded diametrically but will not permit it to be displaced axially. Near its lower end, the plunger has a side opening 146a (FIG. 10) through which pulp and plugs of rind are discharged.

The machine is put into operation by energizing the motor 125, causing the shaft 120 to be rotated at a predetermined speed. One revolution of shaft 120 causes one-half revolution of the fruit-feed shaft 41, one complete oscillation of shaft 100 to which the upper cup 57 is connected, and one complete oscillation of the lever 132 on which the finishing tube plunger 146 is carried. Accordingly, with the apparatus in the position indicated in FIGS. 1 and 2, an orange is first fed from the feed chute 37 and dropped into the lower cup 44. Counterclockwise rotation of cam 102 (FIG. 2) causes the upper cup 57 to swing down over the orange and begins a squeezing action. When the fingers 54 of the two cups reach the intermeshed position of FIG. 6, the orange is firmly gripped by the fingers which apply a substantially uniform pressure to the fruit at all points of contact therewith. The upper cutter 115 has punched a disc-like plug P from the top of the orange and the lower cutter 86 has cut a similar plug PP from the lower surface. At this point the squeezing of the orange has begun, and the lower plug is being forced downwardly toward the finisher tube 84 with the released juice following close behind. The plunger 146, controlled by cam 130, is at this time near its lowermost position. As the squeezing progresses, the plunger moves upwardly in the finisher tube. Pulp and previously cut rind discs, already lodged in the plunger, cause the plunger to have a piston-like action to force the juice laterally through the openings in the finisher tube to be collected in the housing 81 and discharged through tube 83.

In FIG. 7 the fingers of the cups have reached their completely interdigitated position, and knives 86 and 115 are in a telescoped condition relative to each other. During movement of the cups toward the position of FIG. 7, the pressure on the orange causes the peel to escape from the cups along the only path available to it, namely, upwardly through the annular passage 119 between the outer periphery of the upper cutter 115 and the inner edges of the fingers 54 of the upper cup. During this movement through passage 119, the upright cutter 118 makes a slice through one side of the orange peel thus allowing it to expand as it moves outwardly of the machine through the hood 90 of the upper cup.

As the peel passes upwardly through the passage 119, the squared-off inner edges of the upper cup fingers 54 rupture the surface with a shredding action causing a release of peel oil cells that are close to the surface of the peel. The oil and shredded particles of peel are urged downwardly by the lower edges of the fingers causing the oil and peel particles to flow along the outer surfaces of the hub 59 for collection in a suitable receptacle.

Continued rotation of cams 102 and 130 bring the upper cup 57 and the plunger 145 back to the position of FIGS. 1 and 2.

A feature of the invention is the fact that the upper cup member 57 moves only a very short arcuate distance to open position but still provides an adequate inlet opening for receiving fruit. In the embodiment of FIG. 1, the plane A of the outer end of the lower cup 44 is disposed at about 32° to the horizontal, and the plane B of the outer end of the upper cup 57 is displaced about 43° from plane A about an intersecting axis when the cup is open.

From the foregoing description it will be evident that the machine of the present invention has several advantages over previous juicers due to the unique rotary movement of the upper cup. In the prior art patents mentioned above, the upper cup is mounted for straight-line movement away from the lower cup and consequently it must be moved a considerable distance before it is clear of the path of the next fruit being fed into the machine. The present pivotal movement of the upper cup is short by comparison since, as seen in FIG. 1, the fruit is fed from the side opposite the pivot axis. Since less movement of the upper cup is involved in the machine of the present invention, the machine can be compact and its speed of operation can be increased over that of the machines with straight-line cup movement. Further, the pivoting movement of the cup permits the use of torsion springs in the assembly rather than elongated coil springs. It should also be noted in FIGS. 1, 3 and 4 that certain of the blades of the cups are curved along the arc of a circle generated about the pivot axis of the upper cup member. This unique, unusual design makes possible the interdigitation of the blades of the two cup members.

What is claimed is:

1. In a first squeezing mechanism of the type wherein the fruit is disposed in a chamber formed by the generally hemi-spherical cavities of two cup members which have fingers which interdigitate to progressively reduce the size of the chamber, the improvement which comprises drive means for moving one of said cup members toward and away from the other member along a short arcuate path between a cup-open position and a cup-closed position.

2. A mechanism according to claim 1 wherein said arcuate path is an arc of a circle generated around a pivot axis and wherein certain ones of said interdigitating fingers of said cups are curved along arcs of circles generated about said pivot axis whereby said fingers will interdigitate as said one cup member is pivoted toward the other cup member.

3. The mechanism of claim 1 wherein said arcuate path is an arc of a circle generated about a pivot axis and the generally hemi-spherical cavity of said one cup member terminates in a first plane passing through the pivot axis of said one cup member, and wherein the cavity of said other cup member terminates in a second plane that intersects said first plane, said second plane being disposed at approximately 32° to the horizontal, and said first plane being spaced from said second plane an angular distance of about 43° about the axis of intersection to define an upwardly opening inlet to said cup.

4. A mechanism according to claim 1 wherein said arcuate path is an arc of a circle generated about an axis, and said drive means is a torsion spring disposed concentric with said axis and operatively connected to said one cup member to move it to cup-closed position.

5. A mechanism according to claim 1 including a support structure, a tubular shaft journaled for rotation in said structure, and a torsion spring disposed in said shaft and operatively connected between said structure and said one cup member for moving said member along said arcuate path.

6. A mechanism according to claim 1 wherein said two cup members are formed from a torus having generally radially extending members which provide the fingers of the cup members.

7. A mechanism according to claim 3 including a driven cam controlling the force-applying action of said spring as it moves in one direction to move said one cup toward cup-closed position, and being effective to move said spring in an opposite direction to an energy-storing position incident to opening of said cup.

8. A mechanism according to claim 3 including means for feeding fruit downwardly into said upwardly opening inlet.

9. A mechanism according to claim 8 wherein said fruit feeding means includes a singulating mechanism driven in timed relation with said cup drive means for selecting one fruit from a supply of fruit and directing it into said inlet during an interval when said cup inlet is open.

10. A fruit squeezing mechanism comprising a stationary support, a lower cup element mounted in fixed position on said support, said lower cup element having an upwardly-facing fruit-receiving cavity and an opening in the base of said cavity disposed on the arc of a circle generated about an axis, said lower cup also having a plurality of spaced fingers extending radially outwardly from said opening, and an upper cup element mounted for pivoting movement about said axis and having a central cavity and radially-extending fingers that interdigitate with the fingers of said lower cup element when said upper cup element is pivoted toward said lower cup element.

11. A mechanism according to claim 10 wherein said stationary support includes a chamber in communication with the opening in said lower cup element for collecting juice squeezed from a fruit during interdigating of the fingers of the cup elements as they move toward cup closing position.

* * * * *